United States Patent

Djafer et al.

[11] Patent Number: 5,948,275
[45] Date of Patent: Sep. 7, 1999

[54] METHOD AND FACILITY FOR TREATING EFFLUENTS LOADED WITH ORGANIC MATERIAL, PARTICULARLY BY WET OXIDATION AND WITH INTERNAL SOLID RESIDUE RECYCLING, AND PURIFICATION FACILITY THEREFOR

[75] Inventors: Malik Djafer, Boulogne-Billancourt; Francis Luck, Noisy-le-Grand; Jacques Sibony, Paris, all of France

[73] Assignee: OTV Omnium de Traltements et de Valorisation S.A., Saint-Maurice Cedex, France

[21] Appl. No.: 08/718,303
[22] PCT Filed: Mar. 16, 1995
[86] PCT No.: PCT/FR95/00321
  § 371 Date: Nov. 18, 1996
  § 102(e) Date: Nov. 18, 1996
[87] PCT Pub. No.: WO95/25698
  PCT Pub. Date: Sep. 28, 1995
[30]   Foreign Application Priority Data
  Mar. 21, 1994 [FR] France .................. 94 03503
[51] Int. Cl.⁶ .................. C02F 1/68; C02F 1/74
[52] U.S. Cl. .......... 210/762; 210/805; 210/806; 210/766; 210/177; 210/195.1; 210/205; 210/218; 210/903
[58] Field of Search ............ 210/762, 761, 210/631, 605, 628, 630, 613, 766, 903, 906, 805, 806, 175, 184, 195.1, 177, 205, 218

[56]   References Cited

U.S. PATENT DOCUMENTS 3,060,118  10/1962  Schoeffel .
3,912,626  10/1975  Ely et al. .
5,366,633  11/1994  Busiman .
5,389,258  2/1995  Smis et al. .

FOREIGN PATENT DOCUMENTS 0 224 905 A2  6/1987  European Pat. Off. .
2 246 652     3/1974  Germany .
523 205       5/1972  Switzerland .
WO 93/02969   2/1993  WIPO .

Primary Examiner—Robert J. Popovics
Attorney, Agent, or Firm—Kinney & Lange, P.A.

[57]   ABSTRACT

An integrated method for purifying industrial and/or urban effluents containing a large amount of organic material in solution and/or suspension, wherein said effluents are treated in a wet oxidation reactor. The effluents are oxidized in the presence of at least one oxidizing gas to mineralize a large part of the organic material therein by producing a gas phase and an essentially liquid phase mainly containing soluble residual organic material, as well as an essentially inorganic solid phase in suspension. The essentially liquid phase from the reactor is subjected to liquid/solid separation to separate the solid phase, and at least a fraction of the separated solid phase is recycled in the wet oxidation reactor. Various alternative embodiments of the method include adding a catalyst and/or an agent for acidifying the recycled solid phase fraction. The facility may operate continuously or semi-continuously between interruptions.

25 Claims, 2 Drawing Sheets

METHOD AND FACILITY FOR TREATING EFFLUENTS LOADED WITH ORGANIC MATERIAL, PARTICULARLY BY WET OXIDATION AND WITH INTERNAL SOLID RESIDUE RECYCLING, AND PURIFICATION FACILITY THEREFOR

CROSS-REFERENCE TO RELATED APPLICATION(S)

This application is a 371 National Phase Application of PCT/FR95/00321 filed Mar. 16, 1995.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The field of the invention is that of the treatment of industrial or urban effluents loaded with solid particles, especially but not exclusively sludge from purification facilities.

More generally, the invention applies to the treatment of effluents that contain a substantial proportion of organic matter and/or matter in suspension.

2. Description of Related Art Including Information Disclosed Under 37 C.F.R. 1.97 and 1.98

The treatment in question consists in ridding the effluents to be treated of a substantial part of the undesirable compounds that they contain in order to discharge them into a natural receiving medium, a purification facility or a system. The effluent considered may be essentially water but it may also be any other industrial fluid to which the invention can be applied.

Typically, this treatment is implemented in a purification facility and seeks to process sludge coming from the process for the purification of the residual water that enters the purification facility. The treatment enables the conversion of the sludge into a suspension whose chemical oxygen demand (COD) is substantially reduced. The solid phase of said suspension which is highly mineralized may be discharged, and the aqueous phase of the suspension could be sent, as the case may be, to the head of the purification facility.

The purification methods used to treat urban or industrial effluents conventionally bring into play biological methods that are aimed at abating their biological oxygen demand (BOD) and that reproduce natural phenomena in accelerating them. However, certain effluents have pollutants that are hardly biodegradable and require the use of special methods and/or frequently require the use of chemical substrates.

One of the efficient types of treatment adapted to this application is that of wet air oxidation.

Wet air oxidation is a technique that has been much described in the prior art, especially in the U.S. Pat. No. 4,721,575 and 4,272,383 as well as for example the French patent FR 2 334 635. This technique is aimed at achieving an intensive oxidation of the organic matter contained in solutions having a high concentration of organic material that has low biodegradability or is not biodegradable. It has been implemented chiefly in the context of the treatment of industrial effluents and consists in placing an oxidizing gas in contact with said solution at a high temperature while at the same time keeping the solution in the liquid state. To this end, the conditions of the implementation of a method of this kind conventionally range from about 5 bars and 160 bars in pressure and from about 100° C. and 350° C. in temperature. The oxidizing gas used may be for example air, oxygen-enriched air or again molecular oxygen.

Other types of treatment exist, especially methods of purification by activated sludge and physical-chemical methods of precipitation. These treatments generally lead to the production of residual sludge, essentially consisting of non-soluble mineral compounds and non-decomposed organic materials.

In France, the quantity of sludge produced by the purification facilities is about one million tons of dry matter per year. About half of this sludge is reconverted for farm use while 35% is stored in waste dumps.

Subsequent to the setting up of new standards that purified waters must comply with, purification sludge is being produced in increasingly great quantities. At the same time, the regulations organizing the storage, agricultural reconversion or deterioration of this sludge are increasingly restrictive, given the fact that sludge of this kind could entail disadvantages to the environment and to health owing to its nature.

The improvement of treatment, with a view to resolving the problem of sludge, is a technological challenge to which the present invention provides a group of approaches. The treatment may in certain cases make it possible to achieve direct compliance with standards on rejection or reutilization.

Conventionally, it has essentially been sought to treat the sludge separately, independently of the process of treatment of the effluents. This treatment may consist in particular of prolonged aeration, anaerobic digestion, incineration, aerobic stabilization or again composting.

The purpose of this treatment especially is to reduce the dry matter content that it contains by oxidizing organic matter. However, the conventional sequences of sludge treatment, which generally include a step of mechanical dehydration have, in the majority of case, a negative influence on the efficient operation of the facility. The main reasons for this negative influence are related to the return of water from the sludge treatment to the head of the facility. This creates a excess load of COD as well as of nitrate to be eliminated by the facility. This excess load could amount to 15 to 30% of the initial load.

To try and resolve these problems, one approach consists in reinforcing the operational conditions of the treatment of the effluents used, in particular so as to accentuate the mineralization of the residual sludge. Thus, in the case of treatment by wet air oxidation, an attempt will be made to reinforce the mineralization by extending the time of the treatment or increasing the pressure, temperature or concentration in oxidizing gases.

However, this strategy tends to make the method very costly.

OBJECTS OF THE INVENTION

An aim of the invention is to provide a method enabling these drawbacks of the prior art to be overcome.

More specifically, a first aim of the invention is to provide a method for the treatment of industrial and/or urban effluents containing a substantial proportion of organic matter that is soluble and/or in suspension enabling the mineralization of matter in suspension to be optimized.

An additional aim of the invention is to provide a method of this kind that is an improvement of the standard method of wet air oxidation, namely essentially a method according to which the effluents are treated in a reactor within which said effluents are made to undergo oxidation in the presence of at least one oxidizing gas so as to mineralize a major part of the organic matter contained in said effluents, by producing firstly a gas phase containing essentially oxygen, carbon dioxide, carbon monoxide, steam and volatile organic compounds and, secondly, an essentially liquid phase containing chiefly soluble residual organic matter as well as an essentially mineral solid phase in suspension.

Another aim of the invention is to provide a method of this kind constituting a new general principle of treatment offering a diversity of variants, and a set of variables adjustable as a function of the effluents and conditions of implementation of the method.

In particular, the invention enables the improvement of the efficiency and cost generated by the use of catalysts of the wet air oxidation reaction. The catalyst may be conventionally introduced in two forms: in the form of an insoluble solid (heterogeneous catalysis) or in a soluble form (homogeneous catalysis).

Homogeneous catalysis is generally appreciated for its simplicity of implementation. However, the other side of the coin is that this method has the drawback of giving rise to high operating costs. Indeed, a choice usually has to be made between either losing the catalyst after it has been used only once or else applying specific and costly physical/chemical methods to separate the catalyst from the reactive environment in order to recycle it.

Heterogeneous catalysis in solid form for its part is difficult to develop in wet air oxidation, especially in the context of the treatment of sludge. Indeed, while this approach makes it possible, in theory, to keep the same quantity of catalyst in order to treat substantial volumes of effluent, its practical implementation is as yet poorly mastered. The reasons are essentially due to the operating conditions as well as to the characteristic of urban waste sludge which speedily give rise to losses of catalytic activity by the dissolving of the catalyst and the formation of deposits.

In this context, an aim of the invention is to provide a method that copes with these drawbacks observed in the prior art by bringing together, at the same time, all the advantages of the different catalytic methods, both homogeneous and heterogeneous.

An additional aim of the invention is to provide a method of this kind that can be implemented in a reactor working in continuous, semi-continuous or batch treatment mode and under different characteristics of flow (plug flow, complete-mixed reactor, etc.).

The invention is also aimed at providing a principle of installation enabling the implementation of a method of this kind.

BRIEF SUMMARY OF THE INVENTION

These goals as well as others that shall appear hereinafter are achieved according to the invention by means of a method of wet air oxidation applicable to effluents forming a solid mass and a liquid mass continuously undergoing oxidation in the presence of at least one oxidizing gas so as to mineralize a major part of the organic matter contained in said effluents, method characterized in that there is carried out a differentiated treatment of the constituents of the effluent consisting in dissociating the time of stay of the liquid mass and the solid mass in the reactor.

This general principle is advantageously implemented, according to the invention, in an integrated method including the use of a wet air oxidation reactor for the effluents by the production, firstly, of a gas phase and, secondly, of an essentially liquid phase containing mainly soluble residual organic matter as well as an essentially mineral solid phase in suspension, method characterized in that there is performed a step of liquid/solid separation of said essentially liquid phase resulting from said wet air oxidation method to isolate said solid phase and in that at least a fraction of said separated solid phase is recycled within said wet air oxidation reactor.

As described in detail further below in the description of various embodiments of the invention, the recycling operation does not mean that said recycled solid phase fraction must obligatorily come out of the reactor before being reintroduced therein. The recycling of the solid phase means only that at least one fraction of said separated solid phase is reused within the reactor during at least one new cycle of wet air oxidation (performed continuously or in batches).

BRIEF DESCRIPTION OF THE DRAWINGS

Other features and advantages of the invention shall appear from the following description of preferred embodiments of the invention given by way of a non-exhaustive illustration and from the appended drawings, of which.

DETAILED DESCRIPTION OF THE PREFERRED EMBODIMENTS

Figure 1:
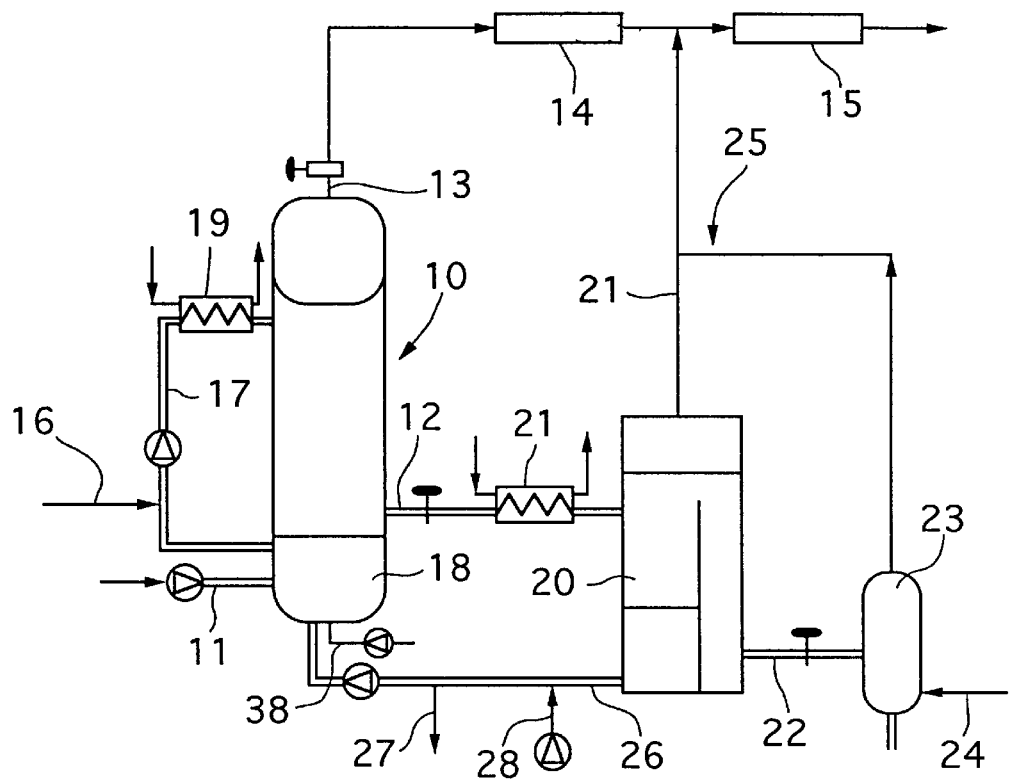
FIG. 1 is a drawing showing an embodiment of an installation for implementing the method according to the invention in a continuous reactor.

Thus, according to a first embodiment, the decantation is done in the reactor itself and at least one fraction of the separated solid phase is recycled (i.e. it undergoes at least one new cycle) in being kept in the reactor, the non-recycled complementary solid fraction as well as the liquid floating on the surface that comes from the decantation being, for their part, removed. These operations are, for example, carried out in reactors working semi-continuously (in which case it is during the periods of interruption of the wet air oxidation reaction that at least a part of the separated liquid phase will be removed from the reactor, and at least a fraction of the separated solid phase will be kept in the reactor) or even in continuously operating reactors. In the latter case, and assuming that a recirculation of the effluent is achieved in the reactor during said reaction of wet air oxidation, it is during the periods of interruption of said recirculation of effluent in the reactor that at least a part of the separated liquid phase will be taken out of the reactor and at least a fraction of the separated solid phase will be kept in the reactor.

However, in another embodiment where the decantation will be done outside the reactor, there will then be a real "recirculation" of the solid phase with extraction of the solid phase out of the reactor and then reintroduction into the reactor of at least a fraction of said separated solid phase.

It will be noted that the present method amounts to the optimizing of the wet air oxidation process by the dissociation, in a novel and original manner, of the two goals pursued in the context of the present invention and more specifically the means used to achieve them, namely:

firstly, the abatement of the chemical oxygen demand (COD) of the effluent to be treated;

secondly, the mineralization of the solid residue derived from the method.

The liquid phase which is essentially constituted by soluble residual organic matter may be sent for example towards a conventional purification facility or biological treatment line. It is possible to limit the operation, for this liquid phase, to a modest abatement of the COD. Indeed, the organic matter that remains, in soluble form, in the aqueous phase of the suspension obtained at the end of the wet air oxidation step may advantageously be used as a substrate for the biomass used in biological treatment. This substrate will in particular be easily biodegradable by the heterotrophic bacteria of the activated sludge used for the conversion of organic nitrogen into molecular nitrogen. This addition of substrate makes it possible to reinforce the efficiency of this bacteria and thus increase the efficiency of removal of nitrogenous pollution contained in said effluent. In conventional systems, the requisite levels of elimination of ammonia nitrogen are difficult to obtain because of a lack, in waste water, of carbon that can be easily assimilated by the heterotrophic denitrifying bacteria. The method according to the invention thus makes it possible also to resolve this problem.

To this end, the parameters of operation (in particular the temperature, pressure, period of stay, quality of catalyst and any other means enabling the conditions of oxidation to be brought into play) will be advantageously adjusted by those skilled in the art so that the N/COD ratio of the liquid phase coming from the wet air oxidation reactor is appropriate. More specifically, it can be seen to it that this liquid phase contains sufficient COD not only to meet the needs of the biological treatment facility to which it is sent but also to treat the additional nitrogen N contained in said recycled liquid phase.

By contrast, the constraints are greater for the solid phase for which it is generally desired to have a major reduction of the organic matter content. The solid phase will therefore, for its part, be recycled within the reactor and thus undergo a repeated oxidation. Those skilled in the art can preprogram the number of repetitions of oxidation so as to obtain the desired mineralization rate. The recycling of the solid phase, which is formed by various insoluble minerals associated with a fraction of organic compounds that are difficult to oxidize, therefore enables selective work on the most refractory part of the sludge. This is all the more efficient as the COD of the sludge proves to be effectively oxidizable with oxidation efficiency values that may range from 80% to 90%, especially in the presence of catalyst.

Furthermore, it has been observed that the recycling of the solid does not affect the efficiency of abatement of the COD of the sludge.

Advantageously, the value of the fraction of the recycled solid phase is computed so as to obtain a rate of recycling of the solid ranging from 1 to 20. The recycling rate can be defined as being equal to the inverse of the fraction of recycled solid. (A recycling of 20% of the solid phase corresponds to a recycling rate of 5.)

This method in addition may be further improved by two variants that may be implemented individually or in combination.

According to the first variant, said wet air oxidation can be done in the presence of catalyst, said catalyst being such that after said liquid/solid separation of the essentially liquid suspension resulting from said wet air oxidation method, said recycled solid phase contains a major proportion of said catalyst, typically as least 60%.

Indeed it has been observed that, surprisingly, the catalyst introduced into the reactor is recovered in the solid phase produced by the reaction. Since at least a fraction of this solid phase is required, according to the invention, to be recycled within the reactor, there is therefore a reutilization of the catalyst during several successive cycles during which it continues to play its role. Thus, an extremely economical process is achieved owing to the reutilization of the catalyst as well as because of the zero marginal cost of its recovery in the solid phase and because of the synergy of this process with the principle of recycling of solid residue that is the basis of the invention.

Preferably, said catalyst is a metal belonging to the group comprising manganese, iron, cobalt, nickel, copper, zinc and the mixtures and compounds of one or more of these elements. In a particularly advantageous way, the catalyst is a soluble compound of copper (such as copper sulfate) or of zinc or of a mixture thereof.

Advantageously, the mass ratio of catalyst metal to chemical oxygen demand (COD) of the effluent before treatment ranges from $5.10^{-4}$ to $3.10^{-1}$ approximately.

According to the second variant, an acidifying chemical additive is added to said fraction of a solid phase separated and recycled within said wet air oxidation reactor. Advantageously, said chemical additive is added so as to adjust the pH factor of said recycled solid phase fraction to values of 1 to 5 approximately.

This optional acidifying chemical treatment enables a more efficient mineralization of the residue through an action of hydrolysis of the organic matter. This variant, although it can be implemented alone, has high synergy with the first variant (with the addition of a catalyst in the reactor). The chemical additive preferably belongs to the group comprising sulfuric acid and organic acids. However, according to another characteristic of the invention, the acidification can be done by bringing the solid phase into contact with nitrogen oxides $NO_x$ (resulting from the catalytic oxidation of the gas phase loaded with ammonia nitrogen produced by the method) and/or with nitrites produced from said $NO_x$.

For the different variants, said wet air oxidation is done preferably at a temperature of about 100° C. to about 350° C., under a total pressure of about 5 bars to about 160 bars. The quantity of oxygen introduced into said wet air oxidation reactor advantageously corresponds to a ratio of oxygen to chemical oxygen demand (COD) of the non-treated effluent ranging from approximately 0.5 to 2.0.

Preferably, said wet air oxidation unit is fitted out with a heat exchanger enabling the heating of the sludge entering said wet air oxidation unit (at initial entry and/or at reentry through a recirculation loop) by means of the liquid phase at exit.

In an advantageous embodiment, the method further comprises:

firstly, a step for the stripping of said essentially liquid phase coming from the wet air oxidation unit and containing chiefly soluble residual organic matter and ammonia, by means of a gas jet, in order to produce a second aqueous phase significantly depleted in ammonia and a second gas phase containing oxygen and ammonia gas among its constituent elements; and secondly, a step for the oxidation of said second gas phase thus obtained, so as to obtain a third gas phase resulting from the essentially complete oxidation of ammonia into nitrogen oxides NO and $NO_2$ (as well as carbon monoxide and volatile organic compounds into carbon dioxide), and said third gas phase containing essentially the nitrogen oxides NO and $NO_2$ thus obtained is used in a process belonging to said treatment line for said effluents to be treated.

If necessary, the third gas phase essentially containing the nitrogen oxides NO and $NO_2$ undergoes a preliminary step for conversion, at least partially, into nitrites before use in a process belonging to said treatment line for said effluents to be treated.

Advantageously, said process for the use of said third gas phase essentially containing nitrogen oxides NO and $NO_2$ belongs to the group comprising their use for:

their reinjection into the wet air oxidation process to accelerate the process of oxidation and limit the production of NH4 during the oxidation of the sludge, the disinfecting of an aqueous phase at any step of the treatment line of the invention or again of un-treated water in said treatment line, the acidification of the solid phase coming from the process of wet air oxidation, the stabilization of the residual sludge coming from the method (primary sludge coming from the main purification facility or secondary sludge coming from the wet air oxidation step) or even sludge not coming from the present treatment line.

The invention also relates to a sludge treatment installation implementing a method as described above as well as a water purification facility comprising a main unit for the treatment of water coupled with a sludge treatment installation of this kind, said sludge treatment installation receiving, at entry, the sludge produced by said main unit and sending back the liquid phase resulting from the treatment of said sludge to the head of said main unit.

As shown in FIG. 1, the method of the invention can be implemented in a wet air oxidation reactor 10 working continuously.

The reactor 10 is supplied with effluents to be treated by the injection conduit 11. These effluents to be treated are chiefly industrial or urban effluents loaded with solid particles, especially but not exclusively sludge coming from purification facilities.

This reactor 10 is provided with heating means that enable heating to a temperature ranging from about 100° C. to about 350° C. Pressurizing means are designed to convey the effluents to be treated present in the reactor 10 at a total pressure of about 5 bars to about 160 bars.

The injection 16 of oxygen is done for example in a loop 17 for the recirculation of sludge from the base 18 of the reactor 10 to its upper part. This arrangement is advantageous but not obligatory. It is possible to envisage the injection of oxygen at another place in the reactor. The quantity of oxygen introduced into said wet air oxidation reactor advantageously corresponds to a stoichiometric ratio of oxygen to chemical oxygen demand (COD) of the non-treated effluent ranging from about 0.5 to about 2.0.

In a standard way, the reactor is provided with two outlet conduits 12, 13:

firstly, a conduit 13 for the removal of a water-saturated gas phase essentially containing oxygen, carbon dioxide, carbon monoxide and volatile organic compounds. These gases may be either burnt in a conventional way at high temperature or treated by catalytic means, for example successively by catalytic oxidation 14 at 200–500° C. approximately (CO oxidation) and then by catalytic oxidation 15 at 300–900° C. approximately (oxidation of $NH_3$);

secondly, a conduit 12 for the removal of an essentially liquid phase containing chiefly soluble residual organic matter as well as an essentially mineral solid phase in suspension.

According to an essential characteristic of the invention, the conduit 12 feeds a gas/liquid/solid separator 20.

Advantageously, an exchanger 20 is located upstream with respect to the separator 20 so as to recover the calories from the effluents treated in order to restore them for example for the preheating of the sludge. For the same reasons, it is also possible to provide for an exchanger 19 in the recirculation loop 17 of the reactor 10. It is thus possible to recover the energy released by the wet air oxidation reaction which is exothermic.

The separator is, for example, a heat and pressure operated decanter/degasser. This simplifies the recompression of the decantation products designed to be reintroduced into the reactor 10. However, those skilled in the art could design other types of separators without departing from the ambit of the present invention.

The separator 20 has three outlets:

i- an outlet 21 for the removal of gases containing especially ammonia gas, which are sent to the catalytic oxidation unit 15 at 300–900° C.;

ii- an outlet 22 for the removal of the separated liquid phase. This separated liquid phase may advantageously be sent to a main purification facility (should the installation described herein be coupled to a water purification facility, of which it treats the sludge and to which it sends the solid phase produced by the treatment of said sludge). It is furthermore possible to carry out a stripping of the liquid phase in a column 23 supplied with stripping gases 24, especially in order to eliminate ammonia. The pH factor of this liquid phase may, as the case may be, be adjusted by the addition, to the column 23, of an alkaline compound such as lime, soda, etc. The stripping gases containing the ammonia gas obtained at the outlet 25 of the column 23 are advantageously treated in the catalytic oxidation reactor 15. The stripping lightens the ammonia load at the main purification facility. Indeed, in the standard installations, the sludge dehydration station, which is eliminated in the context of the invention, is generally responsible for the return to the head of the facility of an ammonia load that may represent 20% of the total load;

iii- an outlet 26 for drawing off the decanted solid residue in order to recirculate it in the reactor, according to the characteristic process of the invention. In this embodiment, the recycling of the invention may consist in sending back a fraction or all the matter coming from the reactor to the entry to this reactor.

A fraction of the solid residue is continuously extracted by the solid discharging vent 27. In the continuous process shown in FIG. 1, the flow rate of sludge discharged at 27 will be adjusted as a function of the flow rate of effluent injected at 11 so as to enable the obtaining of the desired recycling rate and, ultimately, the desired mineralization rate. The recycling rate will herein be the ratio of the mass flow rate of solid materials recycled in the conduit 26 to the mass flow rate of solid material leaving the system by the conduit 27. The value of the fraction of recycled solid phase is computed so as to generally obtain a rate of recycling of the solid of 0 to 20.

The recycling thus enables an increase in the level of mineralization of the solid phase while at the same time preserving the performance characteristics of the wet air oxidation. Indeed, for a given time of stay (for example of the order of one hour) of the effluents in the reactor 10, the solid residue will have an average time of stay that is greater owing to the recycling. It will therefore be subjected to an oxidation treatment of greater intensity that enables the increasing of its mineralization and also, as has been seen, a reduction of their volatile matter content.

The stripping obtained in column 23 can be done by means of an air jet introduced at 24. In this case, the gases 25 coming from the stripping are then advantageously combined with the gases coming from the catalytic oxidation reactor 14 to be treated in the reactor 15. This combination makes it possible in particular to preheat the gas phase before it is introduced at 15. However, in one subvariant (not shown), the stripping gases 24 may be directly constituted by the gas phase coming out of the reactor 14. In this case, the outlet of 14 is connected at 24 instead of being connected at 15.

According to a first variant of the invention, the addition of catalysts improve the efficiency of the process. The catalyst is introduced directly into the reactor 10.

The catalyst is advantageously a transition metal such as manganese, iron, cobalt, nickel, copper, zinc and the mixtures and compounds of these metals. Typically, the compounds used will be soluble compounds of copper and of zinc and their mixture. As already mentioned, the catalyst may conventionally be introduced in two forms: in the form of insoluble solid (heterogeneous catalysis) or in the form of soluble solid (homogeneous catalysis). However, according to the invention, even when a homogeneous catalyst is used, the method enables the recovery and recycling of almost the totality of the catalyst initially introduced. In other words, by the reintroduction, into the reactor 10 (and hence into the new sludge to be treated), of the mineral residue coming from the catalytic treatment of the sludge, catalytic properties are observed enabling the continuous use of a catalyst to be limited.

Figure 3:
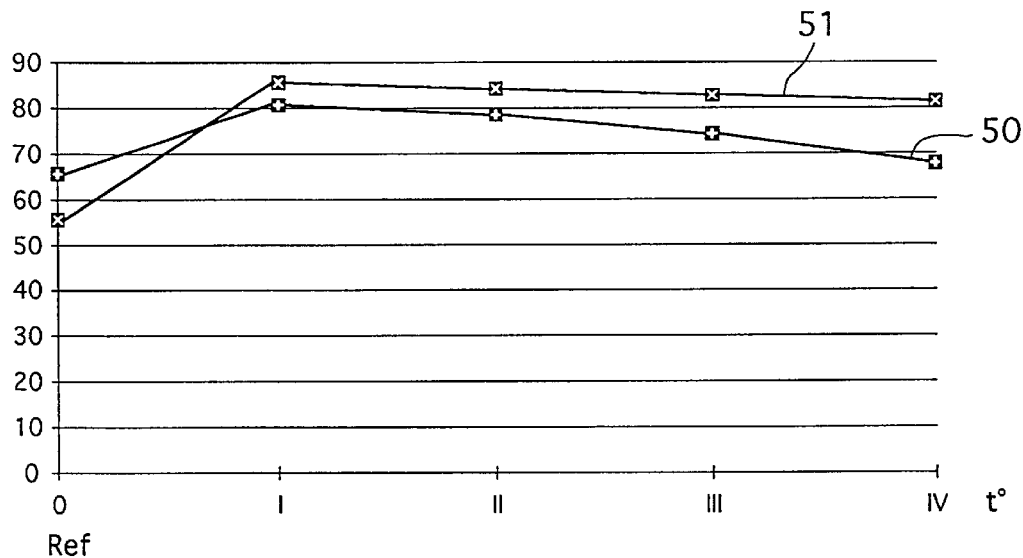
FIG. 3 is a graph illustrating the performances in terms of COD abatement rate obtained by implementing the first variant (recycling with catalyst) and then the second variant (recycling with catalyst and acidification) in the context of the method of the invention.

This is illustrated by the curve 50 of the graph of FIG. 3. This graph shows the abatement rate of COD as a function of time and more specifically as a function of successive sludge recycling operations performed during batch tests. The tests were done at 215° C. in the presence of copper sulfate. The "reference" (to the far left) corresponds to a treatment without catalyst. The instants I, II, III and IV respectively correspond to an initial batch with the introduction of catalyst and then to the following batches in which there is introduced the sludge coming from the immediately preceding batch. Owing to the fact that this sludge contains a major part of the initially introduced catalyst, the abatement of the COD, even if it decreases slightly from batch to batch, is still remarkably greater than the abatement of the reference batch, at least up to the fourth repetition.

Through the invention, in this variant, it is therefore enough merely to compensate for the marginal losses of catalyst to maintain nominal efficiency. This represents a considerable economic gain for the industrial-scale implementation of the process.

The results are improved when a preliminary acidification of the recycled phase is done (this is the second variant combined with the first one). This acidification is done advantageously by the injection, at 28, either of a pumped liquid acid phase or again of a compressed gas phase (for example $NO_x$ as specified here above). This acid phase, whether liquid or solid, could be mixed with the recirculated solid by any appropriate means (using porous supports, static mixers etc.).

According to another embodiment, the injection of the acid phase can also be done for example directly at 38, at the base 18 of the reactor.

In general, the acidification makes it possible to achieve a level of performance comparable with what is usually obtained with far more stringent operating conditions in terms of pressure and temperature. This acidification has two effects which are synergic with the other functions of the method:

it enables the hydrolysis of the organic matter associated with the solid phase, which is generally highly refractory since it is not oxidized after one hour of wet air oxidation treatment;

it prompts the solubilization of the precipitated copper (or if necessary another metal or metal compound used as a catalyst, alone or in combination with copper) that can be reintroduced into the reactor 10 with the solid phase in association with the sludge to be treated.

The curve 51 of FIG. 3 takes account of the percentage of abatement of organic matter under the same conditions as for the curve 50, with the exception however that, in these tests an acidification of the recycled solid residue has also been carried out. It is observed that, by carrying out an acidification, the catalytic effect is substantially prolonged even if the quantity of catalyst is not adjusted as a function of losses (for example of the order of 20%).

Other results (not shown) indicate that the volatile matter content of the solid residue also undergoes a significant effect and is reduced from 23% to 10% without acidification and to 5.7% with acidification.

Figure 4:
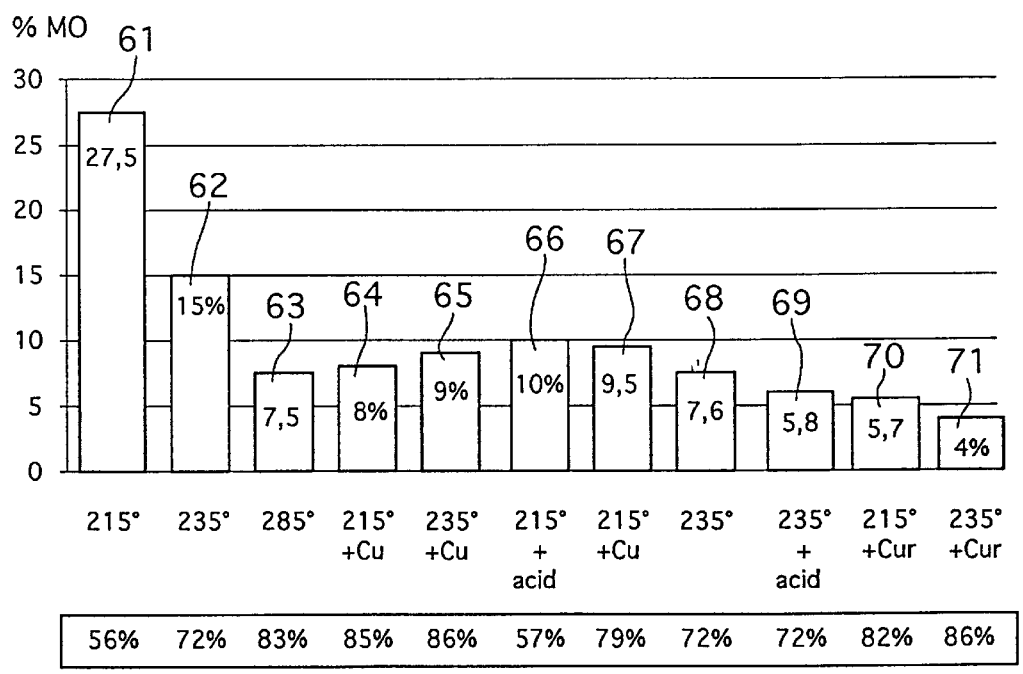
FIG. 4 shows the comparative graph of the residual organic matter content observed during successive tests under different operating conditions.

The graph of FIG. 4 enables a comparison of the residual organic matter (O.M.) rate (on the y-axis scale) as well as the COD abatement rate (the table shown at the base of the graph) for different conditions of the implementation of the wet air oxidation method.

More specifically:

the first three blocks 61, 62, 63 illustrate the rising abatement rates obtained when work is done at rising temperatures (respectively 215° C., 235° C. and 285° C.) with neither recycling, nor catalyst nor acidification;

the next two blocks 64, 65 correspond to standard methods, also without recycling, in which however copper has been added as a catalyst. It is observed that, for equal temperatures (215° C. and 235° C. respectively), the performance characteristics obtained are particularly better than they are in the absence of copper;

the next three blocks 66, 67, 68, 69 show the performance characteristics obtained by implementing the recycling of the solid residue according to the invention, in classifying different tests by order of increasing efficiency, that is to say successively: with acidification only (at 215° C.), with copper only (at 215° C.), without addition of Cu or acidification (at 235° C.) and finally with acidification alone (at 235° C.);

the last two blocks 70, 71 correspond to the variants that have proved to be the most efficient in terms of O.M. %, namely tests with recycling, copper catalyst and acidification combined, at 215° C. and at 235° C.

Figure 2:
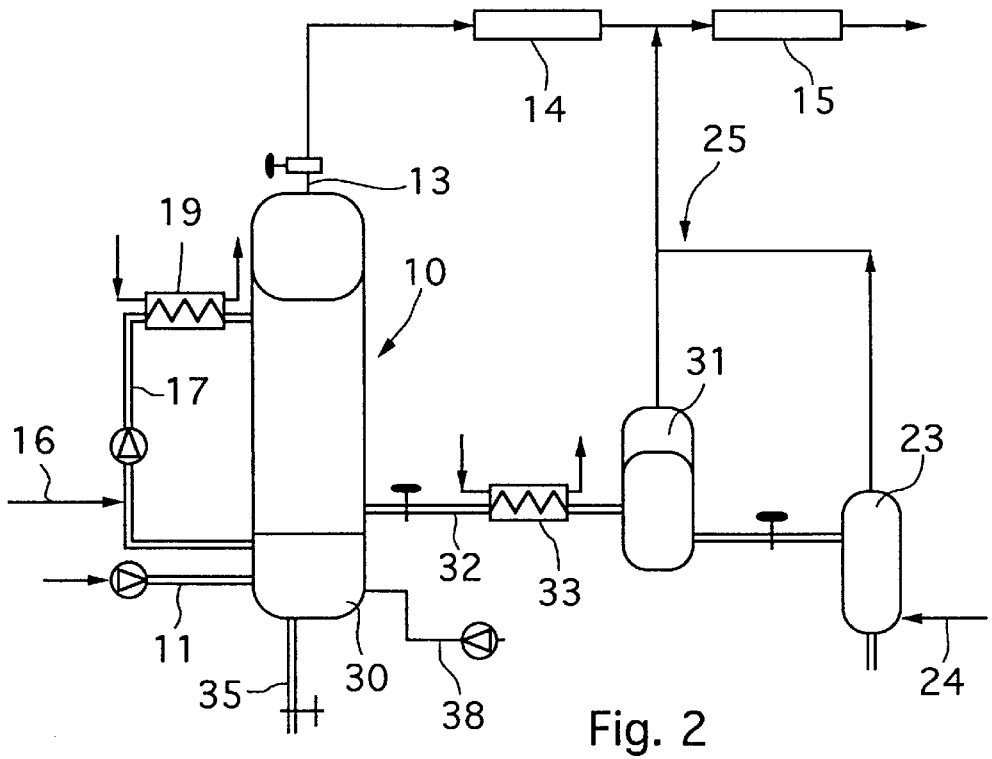
FIG. 2 is a drawing showing an embodiment of an installation for implementing the method according to the invention in a semi-continuous reactor.

FIG. 2 gives a schematic view of an embodiment of an installation for implementing the method according to the invention in a semi-continuous reactor.

The same numerical references as for FIG. 1 have been used to designate the same elements. The differences lie in the decantation function. Indeed, instead of being done outside the reactor 10 in a specific separator (20 in FIG. 1), the separation of the solid residue is herein achieved at the very bottom 30 of the reactor 10. A discharge vent 35 is used to draw off all or a part of the decanted solid matter.

The recycling which is characteristic of the invention is therefore done by keeping, in the reactor, at least a part of the solid matter resulting from treatment within the reactor. The recycling rate will be the ratio of the quantity of solid matter contained in the reactor 10 to the quantity of solid matter entering the reactor 10 via the conduit 11 (or again the quantity of solid matter coming out of the reactor 10 by the discharge vent 35).

The advantage of this approach, apart from the fact that there is a saving of an external decanter (which is all the more costly as it is generally sought to carry out the separation under heat and under pressure to facilitate the recompression of the solid residues recycled in the reactor 10), is that the conservation of a quantity of solid mass in the reactor makes it possible to gain a degree of thermal inertia that is useful for restarting the reaction, and is available at each iteration from the very beginning of the injection of the effluents to be treated.

Owing to the fact that the separation of the solid phase is done within the reactor, there is no longer need for anything other than a gas/liquid separator 31 connected to an outlet conduit 32 from the reactor, this conduit being provided if necessary with a heat exchanger 33 whose role is similar to that of the exchangers 19 and 21 of FIG. 1. The gases and liquids obtained at the outlet of the decanter 31 are treated similarly to those obtained at the outlet of the separator 20 of the embodiment of FIG. 1.

The operational mode of the semi-continuous reactor is as follows:

first of all the sludge 11 is injected before the heating of the reactor 10 and before the injection of the oxygen 16;

the oxidation operation is carried out for example for a period of about 1 hour;

the recirculation of the loop 17 as well as the injection of oxygen 16 is stopped;

the decantation of solid matter at the bottom 30 of the reactor 10 is allowed to take place;

the aqueous phase treated by the conduit 32 is discharged and a fraction of the decanted solid matter is also taken, for example through the discharge vent 35 (which may be located precisely at the bottom of the reactor 10 or at any other place enabling the quality of mineralization of the solid residue to be optimized);

the reactor 10 is placed under temperature again and a new batch of effluents to be subjected to a new repetition of the wet air oxidation process is reinjected.

The method of the invention may also be optimized by reusing the nitrogen oxides $NO_x$ that can be produced by the $NH_3$ oxidation 15 within the processing line, as described in the appended patent application filed on behalf of the same Applicant.

It is known that the treatment of urban sludge by wet air oxidation produces an aqueous phase containing chiefly COD in soluble form as well as ammonia gas. When the specifications of the purification facility do not enable the treatment of the aqueous phase produced by the wet air oxidation of the sludge, given the concentrations of ammonia present, it will be advantageous to provide for means for the elimination and/or useful conversion of the ammonia gas produced. This is the object especially of the stripping means 25 and catalytic oxidation means 15 of the installations of FIGS. 1 and 2, enabling the conversion of ammonia gas into nitrogen oxides $NO_x$ ($NO$, $NO_2$, $N_2O_5$, etc.) or into $N_2$.

It is possible to find several uses enabling the nitrogen oxides to be put to profitable use on the spot, especially by reinjecting them into the reactor 10 to accelerate the process of oxidation and limit the production of $NH_4$ during the oxidation of the sludge, or by using them in order to disinfect water or again to acidify (28) the solid phase during the recycling 26 or to restabilize the residual sludge derived from the method or even untreated sludge in the context of the present invention.

We claim:

1. A method for the purification of industrial and/or urban effluents containing a substantial proportion of soluble organic matter and/or organic matter in suspension, comprising the acts of:

treating said effluents in a wet air oxidation reactor within which said effluents are made to undergo an oxidation in the presence of at least one oxidizing gas so as to mineralize a major part of the organic matter contained in said effluents, the treating act producing, firstly, a gas phase and, secondly, an essentially liquid phase containing mainly soluble residual organic matter as well as an essentially mineral solid phase in suspension, separating the mineral solid phase in suspension from said essentially liquid phase resulting from the treating act to isolate said solid phase; and recycling at least a fraction of said separated solid phase within said wet air oxidation reactor.

2. Method according to claim 1, wherein the separating act is done in a separator located outside the wet air oxidation reactor.

3. Method according to claim 1, wherein the treating act is performed semi-continuously between periods of interruption, and wherein the separating act is performed within the wet air oxidation reactor during the periods of the interruption of the treating act, and further comprising:

discharging at least a part of the separated liquid phase from the reactor while retaining at least a fraction of the separated solid phase in the reactor.

4. Method according to claim 1, further comprising:

recirculating the effluent in the reactor in the course of the treating act.

5. Method according to claim 4, wherein the recirculating act is performed between periods of interruption, and wherein the separating act is performed within the wet air oxidation reactor during the periods of interruption of the recirculating act, and further comprising:

discharging at least a part of the separated liquid phase from the reactor while retaining at least a fraction of the separated solid phase in the reactor.

6. Method according to claim 1, wherein the treating act is done in the presence of catalyst, said catalyst being such that, after the separating act, said recycled solid phase contains at least 60% of said catalyst.

7. Method according to claim 6, wherein the catalyst is a metal selected from the group consisting of manganese, iron, cobalt, nickel, copper, zinc and mixtures and compounds thereof.

8. Method according to claim 7, wherein the catalyst is selected from the group consisting of soluble compounds of copper, soluble compounds of zinc and mixtures thereof.

9. Method according to claim 6, wherein the catalyst comprises a catalyst metal, and wherein a mass ratio of catalyst metal to chemical oxygen demand (COD) of the effluent before the treating act ranges from $5.10^{-4}$ to $3.10^{-1}$ approximately.

10. Method according to claim 1, further comprising:
adding an acidifying chemical additive to the separated solid phase.

11. Method according to claim 10, wherein the adding act adjusts the pH factor of the separated solid phase to values ranging from approximately 1 to approximately 5.

12. Method according to claim 10, wherein the chemical additive is selcted from the group consisting of sulfuric acid and organic acids.

13. Method according to claim 1, wherein, with a rate of recycling defined as being equal to the inverse of the fraction of recycled solid to total separated solid phase, the solid phase is recycled at a rate of recycling ranging from 1 to 20.

14. Method according to claim 1, further comprising:
biologically treating an aqueous phase coming from the separating act at exit from said reactor.

15. Method according to claim 14, further comprising:
adjusting operating parameters of the treating act to regulate a nitrogen to chemical oxygen demand ratio of the aqueous phase coming from the separating act, wherein said operating parameters include temperature, pressure, period of stay, and quality of catalyst.

16. Method according to claim 1, characterized in that the treating act is done at a temperature ranging from about 100° C. to about 350° C., under a total absolute pressure ranging from about 5 bars to about 160 bars.

17. Method according to claim 16, wherein a quantity of oxygen introduced into said wet air oxidation reactor provides a ratio of oxygen to chemical oxygen demand (COD) of the non-treated effluent ranging from approximately 0.5 to 2.0.

18. Method according to claim 1 carried out in a treatment line for the industrial and/or urban effluents, wherein the essentially liquid phase coming from the treating act contains ammonia, and further comprising:
stripping ammonia from the essentially liquid phase by means of a gas jet, in order to produce a second liquid phase signifcantly depleted in ammonia and a second gas phase containing oxygen and ammonia gas; and
oxidizing the second gas phase so as to obtain a third gas phase resulting from the essentially complete oxidation of ammonia into nitrogen oxides NO and NO2 as well as carbon monoxide and volatile organic compounds into carbon dioxide; and
reintroducing said third gas phase into the treatment line for said effluents to be treated.

19. Method according to claim 18, further comprising:
converting the third gas phase at least partially into nitrites before the reintroducing act.

20. Method according to claim 19, wherein the reintroducing act is selected from the group consisting of:
reinjecting the third gas phase into the wet air oxidation reactor to accelerate oxidation and limit production of NH4 during oxidation of the effluents,
disinfecting an aqueous phase of the treatment line,
acidifying the solid phase coming from the treating act, and
stabilizing sludge.

21. Method according to claim 1, wherein the effluents treated include residual sludge of urban or industrial water treatment facilities.

22. An installation for the purification of industrial and/or urban effluents containing a substantial proportion of soluble organic matter and/or organic matter in suspension, the installation comprising:

a continuous wet air oxidation reactor for treating said effluents within which said effluents are made to undergo an oxidation in the presence of at least one oxidizing gas so as to mineralize a major part of the organic matter contained in said effluents to produce, firstly, a gas phase and, secondly, an essentially liquid phase containing mainly soluble residual organic matter as well as an essentially mineral solid phase in suspension; and a separator distinct from said reactor for separating the essentially mineral solid phase in suspension from the essentially liquid phase to isolate the solid phase;

an inlet conduit connecting the reactor to the separator, the inlet conduit receiving the essentially liquid phase produced by the reactor and transferring the essentially liquid phase to the separator; and a return conduit connecting the separator to the reactor, the return conduit recycling at least a fraction of the separated solid phase to said reactor.

23. Installation according to claim 22, further comprising:
a heat exchanger within the wet air oxidation reactor enabling the heating of the effluents entering said wet air oxidation reactor with heat from the separated liquid phase at exit from the reactor.

24. The installation according to claim 22, further comprising:
a main water treatment unit coupled to the reactor, the main water treatment unit providing effluents to the reactor, the main water treatment unit having a head which receives the liquid phase resulting from the treatment of the effluents.

25. An installation for the purification of industrial and/or urban effluents containing a substantial proportion of soluble organic matter and/or organic matter in suspension, the installation comprising:

a wet air oxidation reactor for treating said effluents within which said effluents are made to undergo an oxidation in the presence of at least one oxidizing gas so as to mineralize a major part of the organic matter contained in said effluents to produce, firstly, a gas phase and, secondly, an essentially liquid phase containing mainly soluble residual organic matter as well as an essentially mineral solid phase in suspension, the reactor further separating the essentially mineral solid phase in suspension from the essentially liquid phase to isolate the solid phase; and means for draining of the separated liquid phase and at least a first fraction of the separated solid phase from the reactor while retaining and recycling at least a second fraction of the separated solid phase within the reactor.

* * * * *